April 16, 1968     L. H. STANLEY     3,378,148
COUNTERWEIGHT FOR SIDE BOOM TRACTOR Filed May 15, 1967     3 Sheets-Sheet 1

INVENTOR.
LEROY H. STANLEY
BY
ATTORNEY

INVENTOR.
LEROY H. STANLEY

BY

ATTORNEY

April 16, 1968  L. H. STANLEY  3,378,148

COUNTERWEIGHT FOR SIDE BOOM TRACTOR

Filed May 15, 1967  3 Sheets-Sheet 3

INVENTOR.
LEROY H. STANLEY

BY

ATTORNEY

# United States Patent Office 3,378,148
Patented Apr. 16, 1968

3,378,148
COUNTERWEIGHT FOR SIDE BOOM TRACTOR
Leroy H. Stanley, 2520 E. 4th St., Tulsa, Okla. 74104
Filed May 15, 1967, Ser. No. 638,433
1 Claim. (Cl. 212—49)

ABSTRACT OF THE DISCLOSURE

A counterweight suitable for use as a counterbalance on a tractor, particularly a tractor with a side boom which is used in laying of pipe in pipeline construction.

This invention relates primarily to a system of counterweights on a tractor, particularly a tractor equipped with a side boom. The tractors equipped with side booms are used extensively in oil field operations to position pipe sections for pipelines. The terrain over which these pipelines are constructed is very uneven and very often contains extremely steep sloping areas. The counterweight system presently employed on side boom mounted tractors is not adequate for the complete safety of the operator and the equipment upon which it is installed. To correct this condition, I have invented a new system of counterbalance in the form of counterweights to add safety for the operator and to better safeguard the side boom mounted tractor from becoming damaged. The side boom mounted tractor presently is equipped with means to counterbalance the weight of the pipe being lifted by the side boom; however, the system of counterweights shown in the patent to Kennedy is positioned permanently over the tracks when in a closed position. Note FIGURE 2 of the patent to H. M. Kennedy, No. 3,236,391, issued Feb. 22, 1966. The patent to Dobeus et al., No. 2,722,320, issued Nov. 1, 1955, also shows a system of counterweights which are mounted on the side of the tractor with means to move hydraulically the counterweights into an up and down position. The system of counterweights for a side boom tractor which I shall disclose differs from the disclosure of the above-cited patents. Details and differences in my system of counterweights shall become obvious from the disclosure which follows.

The object of this invention is to overcome the problem of better counterbalancing a section of pipe which is being installed in a pipe line system.

Another object of this invention is to provide a side boom tractor counterweight attachment which when in an extended position will adequately balance the tractor and the load being supported by the side boom.

Still another object of this invention is to provide a counterweight attachment which when in a closed position will not put the tractor out of balance on uneven terrain.

Figure 1:
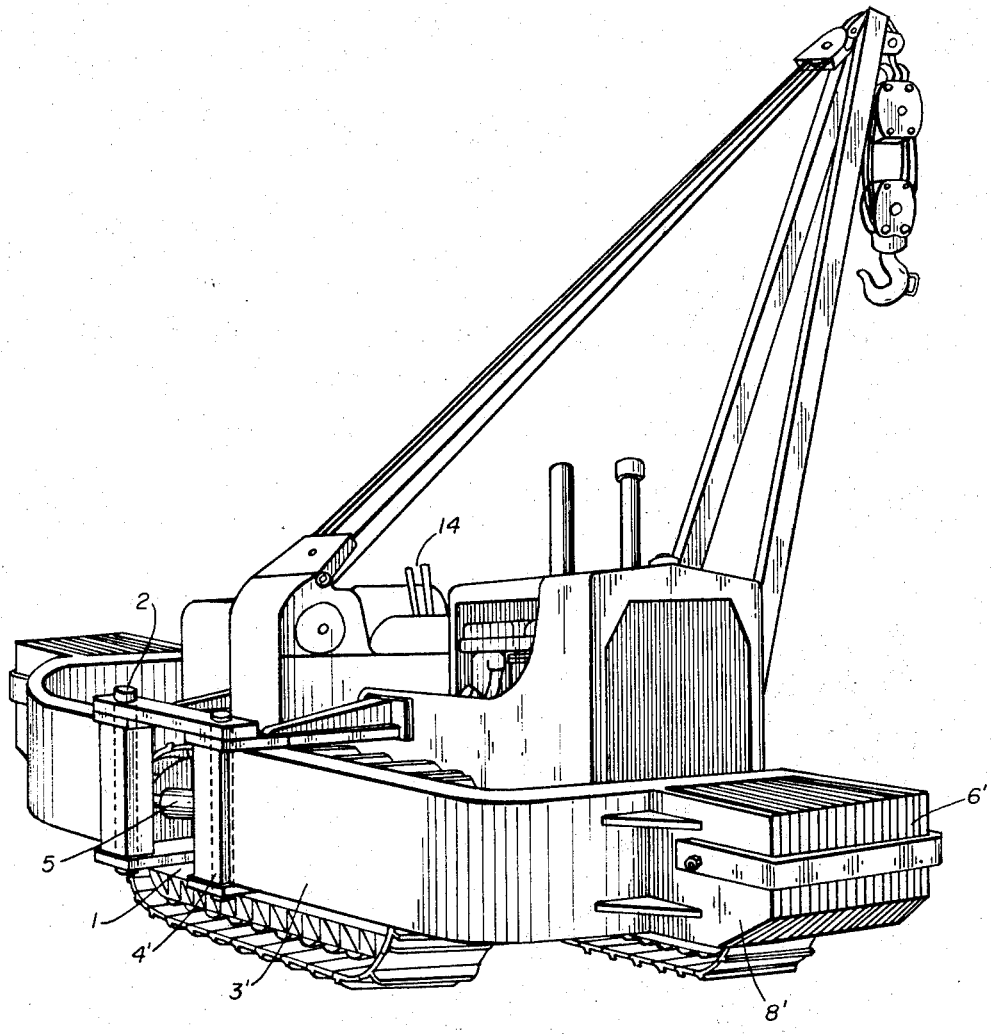
FIGURE 1 is a perspective drawing showing the improved counterweight attachment in combination with a side boom attachment.

Reference is made to FIGURE 1 which shows the complete assembly of a side boom tractor with the counterweight system attached on one side of the tractor outside the tracks. The counterweight assembly 1 comprises pivot means 2, attached to the pivot means through a sheath 4' in the form of an H-beam with plates welded to the H-beam is connecting means 3'. Suitable pivot means are shown as two pins each attached to this top and bottom of the H-beam assembly. The connecting means 3' is welded to the sheath 4' and directioned outwardly from the pivot means in the form of heavy plates properly supported on the pivot pins and bent to form a round corner with the plate moving directionally inboard around a 90-degree angle from the initial direction of the plate. The plates which form part of the supporting structure for the counterweights as previously stated are welded to the sheath 4'. The plates are welded on the other end to a supporting carriage 8', which supports the counterweights. Means to actuate the supporting carriage for the weights is shown at 5. The whole counterweight assembly is mounted outside the tracks of the tractor, a fact which I shall show to be advantageous in the operation of the tractor along a pipeline.

Figure 2:
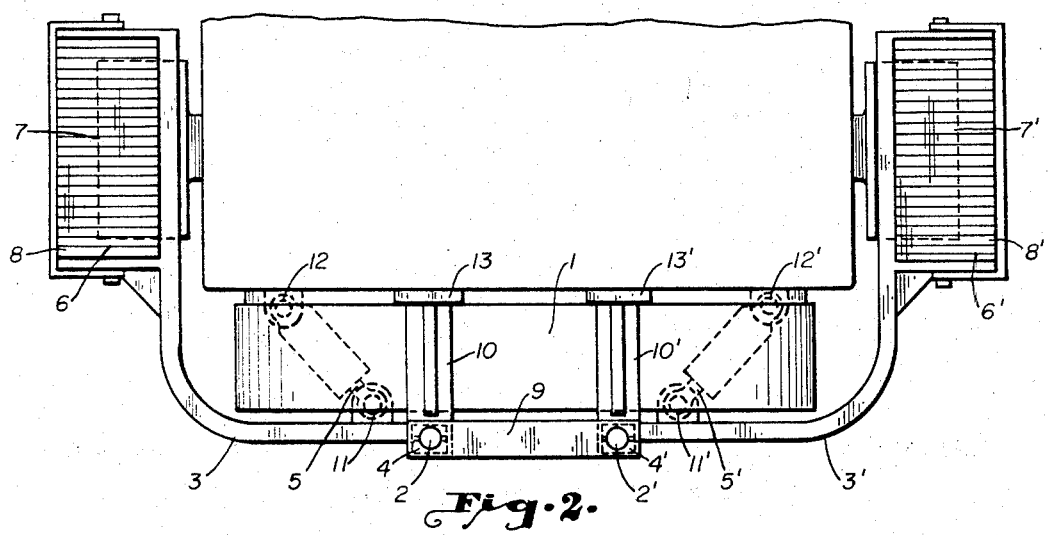
FIGURE 2 is a top view of the counterweight attachments in combination with a side boom tractor in an outboard position.

Reference is made to FIGURE 2 which is a top view illustrating the counterweight assembly 1 in a closed position. In this position the counterweights 6 and 6' are shown on the supporting carriages 8 and 8' which in turn are further supported when the counterweights are in a resting position by additional structures 7 and 7' attached to the chassis of the tractor itself. The supporting carriage platforms 8 and 8' are shown as being attached to the curved plates 3 and 3'. The curved plates are pivoted at 4 and 4'. The pivot pins are braced by a bracket 9 and the supporting frames 10 and 10'. The supporting frames 10 and 10' are welded to the chassis at 13 and 13'. The frames 10 and 10' provide the attaching means to mount the counterweight assembly onto the tractor. Both of the curved plates are actuated by hydraulic means 5 and 5'.

Figure 3:
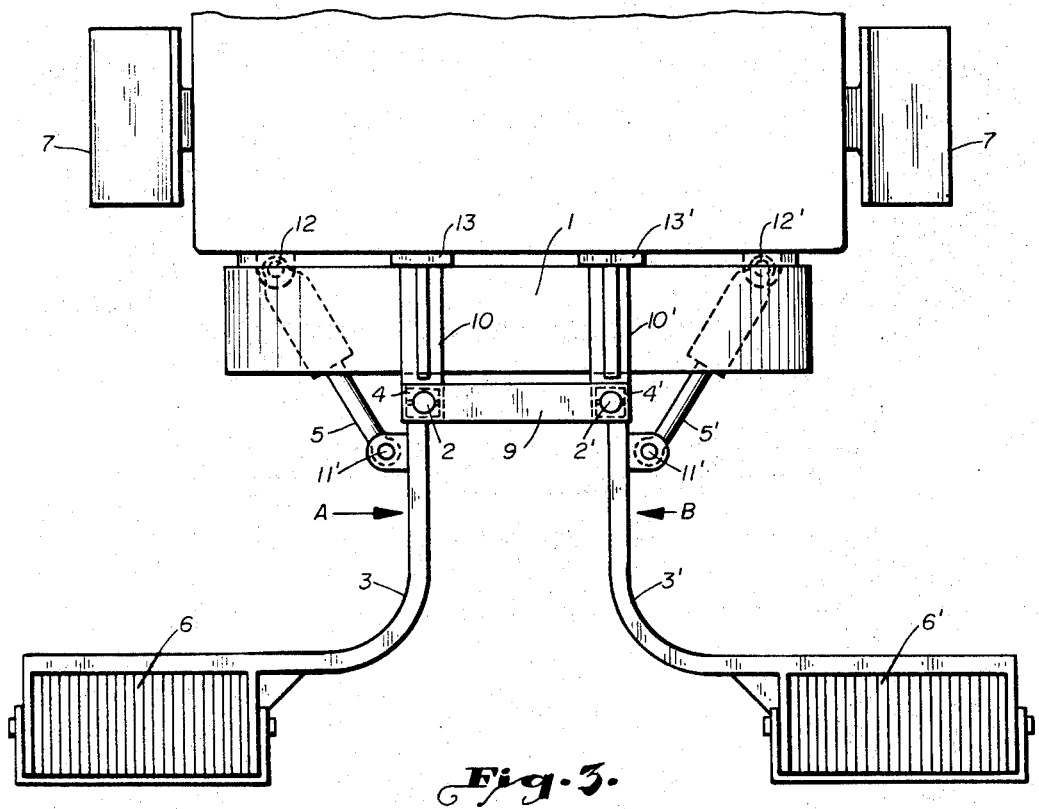
FIGURE 3 is a detail drawing showing the means of attaching the counterweight to the tractor and the position of the counterweights in a closed or travelling position.

Reference is made to FIGURE 3 which illustrates the counterweights 6 and 6' in an outboard position. The support structures 7 and 7' are shown as being attached to the chassis of the tractor. The balance of the components are numbered to correspond with the numbers shown in FIGURE 3. This additional support means is necessary so that the tractor in moving from one place to another will have sufficient support means for the counterweights which are extremely heavy. Without this added support, the movement over rough terrain would be extremely hazardous on the supporting structure for the counterweights. The reason for resting the counterweights in this location while moving from one place to another is to balance the tractor so that the tractor in moving on uneven terrain will not turn over. The present equipment does not provide resting the counterweights in this position when moving. Side boom operators have experienced many casualties due to the imbalance of the tractor presently carrying a counterweight attachment. In addition, the placing of the counterweights in this position when traveling affords better visibility for the tractor operator.

Figure 4:
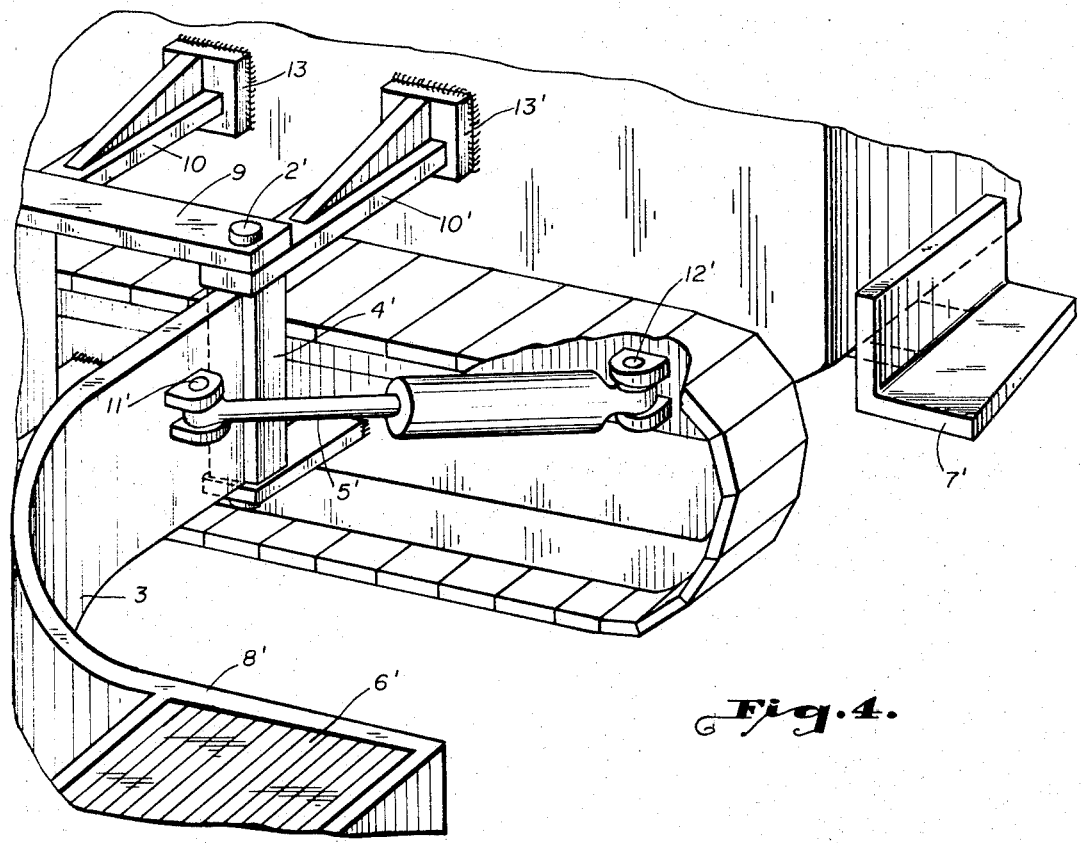
FIGURE 4 is a detail drawing showing the counterweight attachments in an open or outboard position and the relative position of the power cylinder between the chassis and the supporting means for the counterweights.

FIGURE 4 illustrates a perspective view of the counterweight in an extended or outboard position. The power cylinder 5' is shown in position between the curved support structure and the chassis of the tractor. In this particular illustration, the power cylinder is shown passing beneath the upper side of the track. This is the preferred embodiment; however, the placing of the hydraulic cylinder in a position above the track is considered to be within the scope of this invention.

Figure 5:
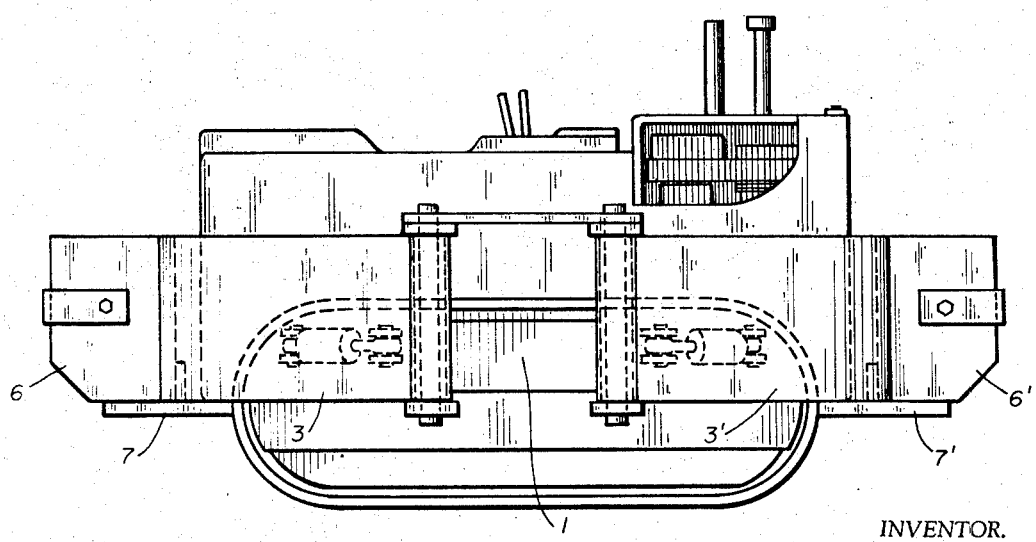
FIGURE 5 is a side view showing the position of the power cylinder in relationship to the counterweight carrier or support means on the body of the tractor when the counterweights are in a closed or carrying position.

FIGURE 5 illustrates the side view of the tractor with the counterweight assembly 1 in a traveling position. The counterweights 6 and 6' are shown resting on supports 7 and 7', FIGURE 2. It can be readily observed that counterweights on a tractor in this position add balance to the front and rear of the tractor and maintain the center of gravity of the tractor at optimum as well as improving the visibility of the tractor operator.

The counterweight assembly of this invention will also assure adequate counterbalance for handling the heavier pipe sections. When in the extended position, the positioning of the counterweights in relationship to the chassis of the tractor can be easily selected by the operator. The movement of each of the counterweight support means is actuated by a pair of hydraulic power cylinders, each cylinder being individually controlled by the operator at 14, FIGURE 1. The hydraulic system used in this assembly must be sufficient to easily move the counterweights and the supporting structure of at least 10 tons on each side of the assembly. The hydraulic system suitable for this application consists of two hydraulic cylinders mounted with toggle linkages 12 and 12', FIGURE 2, directly to the chassis of the tractor. The piston rod which moves in and out of the hydraulic cylinder is connected through another toggle linkage onto the inner face of plate 3 and 3', as shown at 11 and 11', FIGURE 2. The hydraulic system itself is the conventional type found on commercial equipment operating by directional flow lever valves. By selectively moving either or both of the levers forward, either or both of the hydraulic piston rods can be moved outwardly to an extreme position for heavy loading of the side boom. For light loading, the position of the counterweights can be selected intermediately depending on the amount of counterbalancing required. The position selected depends on the requirements of the side boom load and the sloping character of the terrain.

To return the sections of the counterweight assembly to a closed or traveling position, the operator pulls the lever controls backward until the load of the counterweight carriage comes to rest on the supporting platforms 7 and 7', FIGURE 5. This provides easy movement of the side boom tractor through narrow spaces. The counterweight assembly consists of two sections, A and B, FIGURE 3, which are identical and which operate in a similar manner. Each section of the assembly is mounted individually on pins at 2 and 2', FIGURE 2. The size of the pins should be of a magnitude great enough to support the plates 3 and 3', FIGURE 2; the supporting platforms 8 and 8', FIGURE 2; along with the counterweights 6 and 6', FIGURE 2. As was stated previously, the pins are welded on the end positions of the H-beams and further supported by braces top and bottom 9, FIGURE 2, which are connected to supports 10 and 10', FIGURE 2.

While I have disclosed the preferred embodiment of my invention, it is understood that the details thereof may be varied within the scope of the following claim.

I claim:

1. In combination with a tractor having a side boom, a counterweight assembly for counterbalancing loading on the side boom, the said counterweight assembly being on the opposite side of the said tractor from the side boom and containing two sections, each similar to the other, the said sections each comprising counterweights mounted on a carrying platform, the carrying platform being movably mounted in such a manner so as to swing in a horizontal and outwardly direction from the said tractor to an extended position, the said carrying platform being attached to a plate mounted in a vertical direction projecting from a sheath pivotly mounted outside the track of the said tractor, the said plate being shaped in such a manner as to curve outwardly at approximately 90 degrees from the initial horizontal direction of the said plates so that the carrying platform rests on a supporting structure forward and aft of the said tractor when the counterweight assembly is in a retracted position.

References Cited

UNITED STATES PATENTS

| 2,261,870 | 11/1941 | Cardwell | 212—49 |
| 3,071,254 | 1/1963 | Stilley | 212—49 |
| 3,236,391 | 2/1966 | Kennedy | 212—49 |

EVON C. BLUNK, *Primary Examiner.*

H. C. HORNSBY, *Assistant Examiner.*